Patented Oct. 7, 1952

2,613,228

UNITED STATES PATENT OFFICE 2,613,228

PRODUCTION OF UNSATURATED FLUORINE-CONTAINING ALICYCLIC ETHERS

Robert P. Ruh, Midland, Mich., assignor to The Dow Chemical Company, Midland, Mich., a corporation of Delaware No Drawing. Application June 2, 1950,
Serial No. 165,877

6 Claims. (Cl. 260—611)

This invention relates to the production of fluorosubstituted alicyclic compounds, and, more particularly, to the production of such compounds by a reaction involving 1,2-dichloro-3,3,4,4-tetrafluoro cyclobutene and an acyclic hydroxy-hydrocarbon.

The present invention is based upon the discovery of a method to produce novel, unsaturated, alicyclic compounds. These compounds have unexpected utility as strong fumigants having relatively low toxicity to warm blooded animals.

According to the invention a fluoro-substituted alicyclic compound is produced from 1,2-dichloro-3,3,4,4-tetrafluoro cyclobutene.

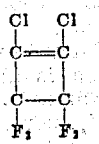

by the action thereon of an acyclic hydroxy-hydrocarbon having not more than four carbon atoms. The reaction is conducted in the presence of a base.

The process of the invention yields substituted cyclobutenes having the general formula

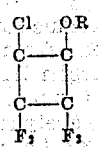

in which R is the residue formed by the removal of one hydroxyl group from an acyclic hydroxy-hydrocarbon having not more than four carbon atoms. Compounds represented by the above formula are unsaturated alicyclic ethers and are believed to be new compositions of matter.

The overall reaction that proceeds according to the method of the invention is illustrated by Equation 1, below, which shows the production of 2-chloro-3,3,4,4-tetrafluoro-1-cyclobuten-1-yl methyl ether from 1,2-dichloro-3,3,4,4-tetrafluoro cyclobutene and methyl alcohol in the presence of potassium hydroxide:

(1)
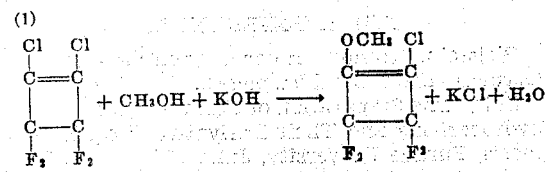

The mechanism of the reaction is not understood; although the experimental results are explained by the hypothesis that it is an addition followed by a dehydrochlorination, efforts to isolate an addition product have been unsuccessful. So far as is known, if the reaction proceeds under a given set of circumstances it produces the unsaturated ether, but no intermediate product.

The reaction of the invention proceeds readily at room temperature, but elevated temperatures may be used if desired. For example, the reaction can be carried out at about 20° C., or in a bomb at a temperature as high as about 120° C. Either higher or lower temperatures may be employed if desired, but are ordinarily not practical.

The reaction is carried out either in an open vessel or by adding the three starting materials to a pressure vessel. If an open vessel is used, the reaction is carried out under reflux, or at a lower temperature e. g., as low as about 20° C. If the reaction is carried out in a closed vessel a temperature as high as about 120° C., or as low as about 20° C. is used. When a closed vessel and an elevated temperature are used, there is ordinarily no reason to employ a pressure higher than about 100 pounds per square inch gauge, and it is usually preferred to conduct the reaction at a pressure not higher than about 50 pounds per square inch gauge. The reaction is conveniently carried out at atmospheric pressure.

In general, the reaction of the invention is conducted for a period of time sufficiently long that it is substantially complete under the conditions employed. The endpoint is conveniently determined by withdrawing periodic samples of liquid from the reaction vessel and titrating to determine alkalinity. Since an acid is released thereby, the reaction is substantially complete when successive samples show no variation in alkalinity. The reaction time that is preferred in a given case depends upon the reactants employed, the amounts thereof, the temperature and pressure used, and other variables. Ordinarily it is desired, when a temperature of about 100° C. is used, to continue the reaction for from about two to about ten hours, although no bad effect results if a longer reaction time is employed. In certain instances the reaction may be substantially complete in a few minutes. Usually, carrying out the reaction for from six to eight hours is practicable. When a reaction temperature of about 20° C. is used, it is ordinarily desired to carry out the reaction for from about 2 to about 100 hours, and it is usually practicable to continue the reaction for from 40 to 60 hours.

As is hereinbefore indicated, the reaction of the invention is conducted in the presence of a base. It is usually preferred that the base be provided in the form of an alkali metal, an alkali metal hydroxide, or a salt formed from an alkali metal and an acyclic hydroxy-hydrocarbon having not more than four carbon atoms. It is advantageous to use at least about one mol of the base per mol of the 1,2-dichloro-3,3,4,4-tetrafluoro cyclobutene, but not more than about two mols of the base per mol of the cyclobutene. It is usually preferred to use at least about 1.2 mols of the base per mol of the 1,2-dichloro-3,3,4,4-tetrafluoro cyclobutene, but not more than about 1.5 mols of the base per mol of the cyclobutene.

The acyclic hydroxy-substituted hydrocarbons that are used in the practice of the invention have not more than four carbon atoms, have not more than one ethylenic double bond, and no acetylenic unsaturation, and are simple aliphatic alcohols, aliphatic glycols, or glycerine. Examples of acyclic hydroxy-substituted hydrocarbons include methyl alcohol, ethyl alcohol, propyl alcohols, butyl alcohols, ethylene glycol, propylene glycols, butylene glycols, allyl alcohol, methallyl alcohol, glycerine, and the like.

The hydroxy-hydrocarbon and the 1,2-dichloro-3,3,4,4-tetrafluoro cyclobutene actually participate in the reaction in a 1:1 molar ratio. Ordinarily it is desired to use the starting materials in about this ratio, although the reaction proceeds either with a substantial excess (as much as ten-fold excess) or with a deficiency (e. g., as little as about one-fourth mol of the hydroxy-hydrocarbon per mol of the cyclobutene).

In the practice of the invention it is not essential that the 1,2-dichloro-3,3,4,4-tetrafluoro cyclobutene be the starting material actually employed; this material can be produced by the dehydrohalogenation of, e. g., 1,1,2-trichloro-3,3,4,4-tetrafluoro cyclobutane, and such dehydrohalogenation can be conducted in a vessel containing sufficient amounts of a base and a hydroxy-hydrocarbon for the reaction of the invention, in addition to a sufficient amount of a base for the dehydrohalogenation; the ether of the invention is the product recovered.

The following examples illustrate preferred embodiments, but are not to be construed as limiting the invention.

*Example 1*

An unsaturated, fluorine-containing alicyclic ether was produced from 1,2-dichloro-3,3,4,4-tetrafluoro cyclobutene and a saturated hydroxy-hydrocarbon according to the following procedure:

A mixture of 1,2-dichloro-3,3,4,4-tetrafluoro cyclobutene (82 grams) and dry methanol (150 cc.) was placed in a flask fitted with a dropping funnel, a stirrer and a reflux condenser. A mixture of dry potassium hydroxide (28 grams) and dry methanol (125 cc.) was added dropwise with stirring over a period of fifteen minutes. The temperature was maintained at about 20° C. during this addition; the mixture was stirred for another five minutes and was then washed with water to remove the excess methyl alcohol that was present. The organic layer was then separated and dried over calcium chloride. Sodium carbonate was also added to remove any acid. Fractionation yielded 2-chloro-3,3,4,4-tetrafluoro-1-cyclobuten-1-yl methyl ether (67 grams). This new compound has the following characteristics: boiling point 116.1° C. at 748 mm. Hg; $n_D^{25}$ 1.3752; density at 25° C. 1.4484 grams per cc.; molecular refraction 30.13 (theoretical 30.17).

*Example 2*

An unsaturated fluorine-containing alicyclic ether was produced from 1,2-dichloro-3,3,4,4-tetrafluoro cyclobutene and a hydroxy-hydrocarbon having a single ethylenic unsaturation according to the following procedure:

1,2-dichloro-3,3,4,4-tetrafluoro cyclobutene (156 grams) and allyl alcohol (150 cc.) were mixed in a flask fitted with a dropping funnel, a stirrer, and a reflux condenser. Phenolphthalein (10 drops) was added, and dropwise addition of a KOH solution (56 grams in 300 cc. of allyl alcohol) was started; this addition was made at a rate sufficient to keep the solution alkaline, and was complete in 20 minutes. Excess alcohol was removed by a water wash; the organic layer was separated, washed twice with water, and dried over anhydrous calcium sulfate. Fractionation yielded 13.5 grams of recovered starting material and 110.0 grams of the desired 2-chloro-3,3,4,4-tetrafluoro cyclobuten-1-yl allyl ether (boiling point 113.2° C.; $n_D^{25}$ 1.3861; density at 25° C. 1.337 grams per cc.; molecular refraction found 38.04; theory 38.94).

I claim:

1. A method of producing an unsaturated, fluorine-containing alicyclic ether that comprises subjecting (a) 1,2-dichloro-3,3,4,4-tetrafluoro cyclobutene to the action of (b) an acyclic hydroxy-substituted hydrocarbon having not more than four carbon atoms, not more than one ethylenic double bond, and no acetylenic unsaturation, in the presence of (c) a base of the group consisting of alkali metal hydroxides, alkali metals, and alkali metal salts of acyclic hydroxy-hydrocarbons having not more than four carbon atoms.

2. A method as claimed in claim 1 in which the hydroxy-hydrocarbon is methanol and the base is potassium hydroxide.

3. A method as claimed in claim 1 in which the hydroxy-hydrocarbon is allyl alcohol and the base is potassium hydroxide.

4. An unsaturated, fluorine-containing alicyclic ether having the general formula

in which R is the residue formed by the removal of one hydroxyl group from an acyclic hydroxy-substituted hydrocarbon having not more than four carbon atoms, not more than one ethylenic double bond, and no acetylenic unsaturation.

5. 2-chloro-3,3,4,4-tetrafluoro-1-cyclobuten-1-yl methyl ether.

6. 2-chloro-3,3,4,4-tetrafluoro-1-cyclobuten-1-yl allyl ether.

ROBERT P. RUH.

REFERENCES CITED

The following references are of record in the file of this patent:

UNITED STATES PATENTS

| Number | Name | Date |
|---|---|---|
| 2,409,274 | Hanford et al. | Oct. 15, 1946 |
| 2,433,844 | Hanford | Jan. 6, 1948 |

OTHER REFERENCES

Bielstein, "Handbuch der Organische Chemie," German (1923) Band VI, page 6.

Bolt, "The Preparation of Certain Fluorochlorohydrocarbons and Their Derivatives," a doctoral thesis, Purdue University, June 1944, pages 1–10 of the abstract plus 2 title pages.

Park et al., Journal of Am. Chem. Soc., vol. 70, April 1948, pages 1550–1552.

McBee et al., "Fluorinated ethers," Industrial and Engineering Chemistry, vol. 39, No. 3, pages 412–415.